United States Patent
Hunter et al.

(10) Patent No.: US 9,977,596 B2
(45) Date of Patent: May 22, 2018

(54) PREDICTIVE MODELS OF FILE ACCESS PATTERNS BY APPLICATION AND FILE TYPE

(71) Applicant: Dropbox, Inc., San Francisco, CA (US)

(72) Inventors: Rian Hunter, San Francisco, CA (US); Jeffrey Bartelma, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 682 days.

(21) Appl. No.: 13/728,628

(22) Filed: Dec. 27, 2012

(65) Prior Publication Data
US 2014/0188868 A1    Jul. 3, 2014

(51) Int. Cl.
*G06F 17/30* (2006.01)
*G06F 3/06* (2006.01)
*G06F 17/27* (2006.01)

(52) U.S. Cl.
CPC ............ *G06F 3/06* (2013.01); *G06F 17/2785* (2013.01); *G06F 17/30091* (2013.01)

(58) Field of Classification Search
CPC ........... G06F 17/30091; G06F 17/2715; G06F 17/2785
USPC .................................................. 707/736, 752
See application file for complete search history.

(56) References Cited

U.S. PATENT DOCUMENTS

| | | | |
|---|---|---|---|
| 5,649,225 A * | 7/1997 | White et al. | 712/23 |
| 5,651,125 A * | 7/1997 | Witt et al. | 712/218 |
| 5,715,452 A * | 2/1998 | Mori et al. | |
| 7,222,231 B2 * | 5/2007 | Russell | G06F 17/30067 707/E17.01 |
| 8,281,410 B1 * | 10/2012 | Sobel et al. | 726/27 |
| 2002/0128995 A1 * | 9/2002 | Muntz | G06F 17/30067 |
| 2006/0106770 A1 * | 5/2006 | Vries | 707/3 |
| 2006/0159098 A1 * | 7/2006 | Munson et al. | 370/394 |
| 2012/0005310 A1 * | 1/2012 | Obata | G06F 9/45537 709/219 |
| 2012/0124092 A1 * | 5/2012 | Teranishi et al. | 707/783 |
| 2012/0166401 A1 * | 6/2012 | Li | G06F 17/3033 707/692 |
| 2012/0297034 A1 * | 11/2012 | Zhu | 709/219 |

* cited by examiner

*Primary Examiner* — James Trujillo
*Assistant Examiner* — Fariborz Khoshnoodi
(74) *Attorney, Agent, or Firm* — Polsinelli PC

(57) ABSTRACT

The speed at which files can be accessed from a remote location is increased by predicting the file access pattern based on a predictive model. The file access pattern describes the order in which blocks of data for a given file type are read by a given application. From aggregated data across many file accesses, one or more predictive models of access patterns can be built. A predictive model takes as input the application requesting the file access and the file type being requested, and outputs information describing an order of data blocks for transmitting the file to the requesting application. Accordingly, when a server receives a request for a file from an application, the server uses the predictive model to determine the order that the application is most likely to use the data blocks of the file. The data is then transmitted in that order to the client device.

22 Claims, 3 Drawing Sheets

PREDICTIVE MODELS OF FILE ACCESS PATTERNS BY APPLICATION AND FILE TYPE

TECHNICAL FIELD

The disclosed embodiments relate generally to accessing data over a network, and more particularly, to predicting access patterns of data over a network.

BACKGROUND

It is common today for users to store their data on both a local storage device on a local network as well as on remote devices in remote networks (e.g., cloud based storage systems). As the number of files and the total amount of data that users need to store and access increases, it is not uncommon for a user's amount of remote storage (including cloud storage) to far exceed the user's local storage capabilities. For example, a user may have 300 Gb of local storage available, but also have several terabytes of remote storage. In these situations, it is not possible for a user to have a local copy of all of the user's files.

When a user attempts to access from a local computing device a file that is stored in a remote location, but for which there is no existing local copy, the file must be transferred from the remote location to the user's local computing device. In general, to accomplish the transfer of a file comprising a plurality of data blocks, a server sequentially streams the data blocks from the remote location to a memory residing on the user's local computing device. The local computing device processes the received data blocks into a file or other media so as to enable the user to access the file. The speed at which enough of the transfer of the file can be completed to enable the local computing device to begin accessing the file is critical both to the quality of service offered by a remote storage provider and level of user satisfaction with a remote storage provider.

SUMMARY

Embodiments of the invention increase the speed at which files can be accessed from a remote location by predicting the file access pattern for data blocks in the file. This beneficially allows users to quickly access documents that are shared on a file server. A file access pattern can be based on a predictive model developed for the application being used to access the file and the type of file being accessed. In one embodiment, the file access pattern describes the order in which blocks of data for a given file type are read by a given application. For example, the file accesses for a particular type of media player (e.g., FLASH) accessing a particular type of video file (e.g., MP4) will be different from the file access patterns of another type of media player (e.g., QUICKTIME) accessing a different type of video file (e.g., .MOV). The file access data is preferably aggregated by different parameters, such as by application, application version, and by file type, over a large number of file accesses across multiple users.

From the aggregated data, one or more predictive models of access patterns can be built for files corresponding to the various combinations of parameters, such as by application, application version, and by file type. A predictive model takes as input the application, which can include the application version, requesting the file access and the file type being requested, and outputs information describing an order of data blocks for transmitting the file to the requesting application. The predictive model can be based on the file access for files that are frequently shared between users of a file server, which synchronizes the files between multiple different client devices. The predictive model is used to predict the access pattern of a subsequent file corresponding to the application and file type of the model. The access pattern can describe the order or sequence of a plurality of non-sequentially offset data blocks within a file. Accordingly, when a file server at a remote storage location receives a request for a file from an application, the file server uses the predictive model for the combination of the requesting application and file type to determine the order that the application is most likely to use the data blocks. The data blocks are then transmitted in the order the client device is likely to need to access the data, thus enabling the client device faster access to the data within the file.

Other embodiments include a system and a non-transitory computer-readable storage medium for predicting a file access pattern based on a model according to the techniques described above. A system embodiment can include a computer processor, and a storage device configured to store files, where each file has a respective file type. A server module, executed by the processor, is configured to serve files from the storage device to client devices in response to file requests by applications on the client devices. An access pattern modeling module, also executed by the processor, is configured to receive access data from the client devices of file accesses by the applications to the requested files. Each instance of access data from a file access indicates the requested file, the application accessing the requested file, the version of the application, a file type of the requested file, and a respective order of access by the application of data blocks within the requested file. The access pattern modeling module is configured to analyze the received access data to identify an access pattern for a combination of an application and a file type, and to create a model of the access pattern for the combination of the application and the file type, where the model indicates a predicted order of access of data blocks of a file by the application. The server module may be further configured, in response to subsequent request from a given application for a file of a given file type, to determine from the model for the combination of the given application and the given file type, a predicted order of access of data blocks of the file by the given application, and to serve data blocks to from the file to the given application according to the predicted order.

The features and advantages described in this specification are not all-inclusive and, in particular, many additional features and advantages will be apparent to one of ordinary skill in the art in view of the drawings, specification, and claims.

The figures depict various embodiments of the invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
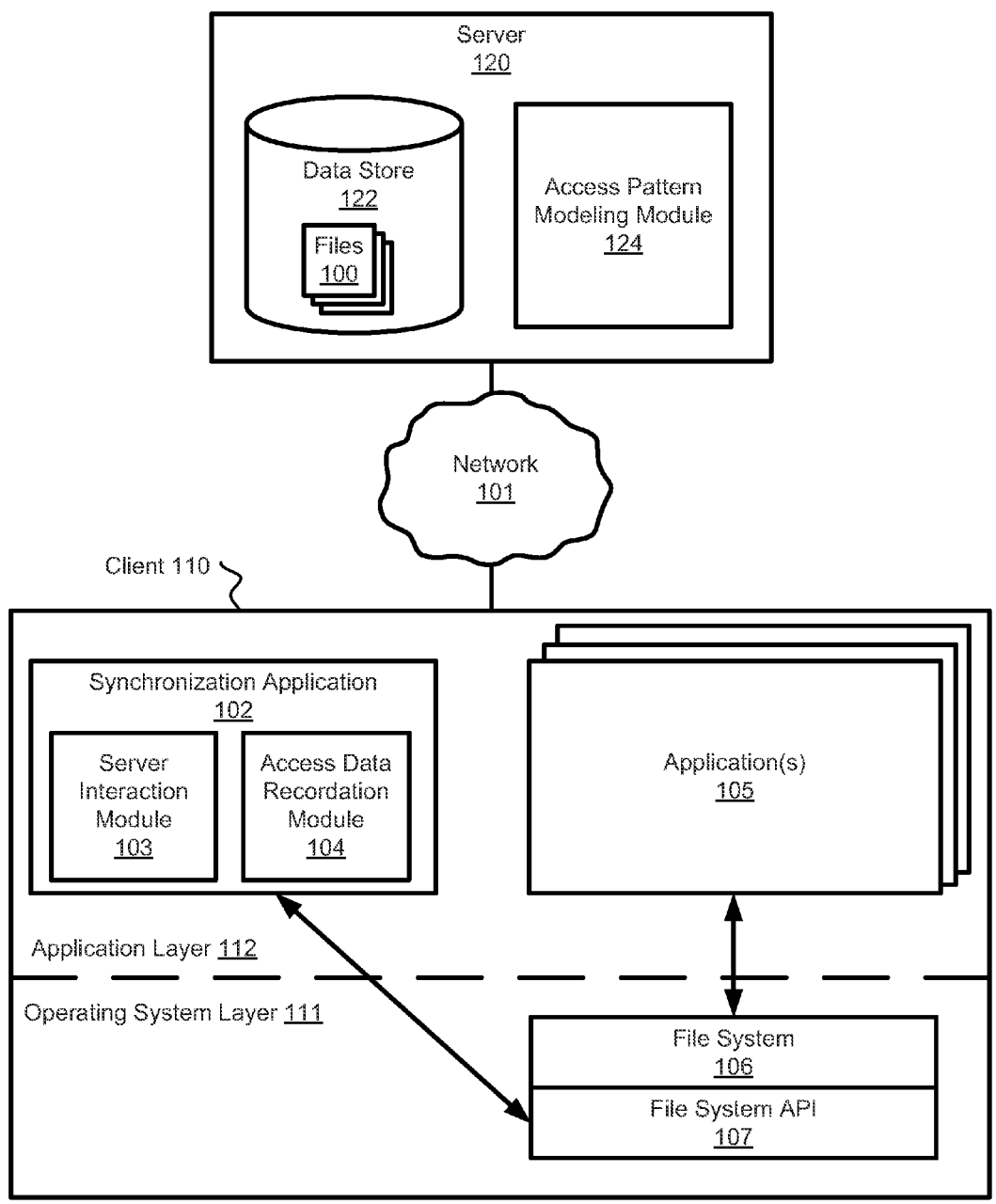
FIG. 1 shows a block diagram of a computing environment in which predicting file access patterns can be performed, in accordance with an embodiment of the invention.

FIG. 1 shows a block diagram of a computing environment in which predicting file access patterns can be performed, in accordance with an embodiment of the invention. The computing environment includes client 110 and server 120 connected via a network 101.

Client 110 can access files 100 by requesting them from the server 120 over the network 101 when a local copy of the file 100 is not available to the client 110 in its local storage (e.g. local disk or memory). The operation of the client 110 in requesting and accessing the file will be described in the context of two layers within the client: an operating system layer 111 and an application layer 112.

The operating system layer 111 of the client 110 can include a file system 106 and a file system API 107. The file system 106 is a means to organize data on the client 110 so that it can be stored, retrieved, and accessed. The file system 106 maintains a listing of the physical locations of the data so that the data can be read from those physical locations. The file system application programming interface (API) 107 is configured to expose the file system to redirect file access requests to a synchronization application 102 so that the synchronization application 102 can assist in accessing the file from the server 120 and recording access data, as described in more detail below. Examples of libraries that allow regular applications in the application layer 112 to handle requests of the file system 106 are CALLBACK FILE SYSTEM™ from EldoS Corporation for devices running the WINDOWS™ operating system from Microsoft Corp., and MACFUSE™ for devices running Mac OS (available at Google Code).

The application layer 112 of the client 110 can include at least one application 105 and a synchronization application 102. The applications 105 are software programs designed for end users operating the client 110. Examples of applications 105 include word processing programs, spreadsheets, database programs, image viewing and editing programs, media players, data analysis programs, engineering programs (e.g., CAD, EDA), etc. There is no limitation on the types of programs that may be used in conjunction with the synchronization application 102. In the course of operating, the applications 105 may request files from the file system 106 to which the client 110 has access, either locally or remotely.

The synchronization application 102 can interact with the server 120 in order to access files stored remotely on the server 120 and ensure that changes to certain files on the server 120 are propagated to the client 110 as part of a synched file system, so that each client 110 maintains a current, updated version of the files locally, and is one means for performing this function. In some cases, the synchronization application 102 may also send files from a client 110 to be synchronized with files on the server 120, and those files may be subsequently shared with other clients according to user preferences. Further, the synchronization application 102 collects access data and reports the access data to the server 120 for use in modeling access patterns, as will be described in more detail below. The synchronization application 102 includes a server interaction module 103 and an access data recordation module 104.

The server interaction module 103 of the synchronization application 102 can manage communications to and from the server 120, and is one means for performing this function. Generally, the server interaction module 103 receives requests for files from an application 105 in the client 110, provides the request to the server 120, receives the files requested by the client 110 from the server 120, and provides the received file to the requesting application 105. The server interaction module 103 may send files from the client 110 for synchronization with the server 120. The server interaction module 103 may also report access data recorded by the access data recordation module 104, as described below.

The access data recordation module 104 of the synchronization application 102 can record instances of data access as clients 110 access files using various applications 105, using information obtained from the file system API 107, and is one means for performing this function. The recorded information includes for each file access, the application that accesses the file, where the application information can include the application version; the file type (such as the file extension or file format, e.g., .pdf, .mpeg, .doc, .mp3, .xls, and others); and the order that the data within the file are accessed (such as the first block read was offset 6, the second block read was offset 60, the third block read was offset 24, and so on for the rest of the file). The access data recordation module 104 can compile the access data in any manner that is useful for reporting it to the server 120. In some cases, the file name and other information about the data access are also recorded. In some implementations, the access data is reported to the server 120 responsive to the access data recordation module 104 receiving another instance of data access. In other implementations, the access data is reported periodically to the server 120, for example in a batch every day.

FIG. 1 illustrates only one client 110 for purposes of clarity. When implemented, the server 120 may be in communication with thousands or millions of clients, and each client may store one or multiple files on the server 120. When represented to the user, the files may be arranged in folders; and folders themselves may be arranged in other folders, as determined by the user; however the underlying storage architecture may be considerably different, and implemented to maximize storage efficiency, and without necessarily mirroring each user's file hierarchy. Examples of client devices include a desktop computer, a laptop computer, a tablet computing device, and a handheld computing device such as a personal digital assistant or a smart phone (e.g., an IPHONE or BLACKBERRY, or a SYMBIAN or ANDROID-based smart phone).

The server 120 stores files and manages the distribution of those files across various clients 110. The server 120 and its components may be implemented using any appropriate hardware for performing file serving and storage; solely for clarity of illustration and description, FIG. 1 illustrates only a single server and one instance of relevant data stores 122 and module 124. The server 120 is comprised or one or more computers, preferably server-grade computers, including one or more high-performance CPUs (processors) and 1 G or more of main memory, as well as 500 Gb to 2 Tb of computer readable, persistent storage, and running an operating system such as LINUX or variants thereof. The operations of the server 120 as described herein are controlled through both hardware and computer programs executed by the processor(s) to perform the functions described herein. The server 120 includes other hardware elements used in the operations described here—including network interfaces and protocols, input devices for data entry, and output devices for data presentation—that are known to those of skill in the art but not germane to this description, and which thus are omitted for clarity. As will be apparent from the following description, the operations and processes described herein for the client 110 and the server 120 necessarily require the operation of a computer system, and cannot be performed merely as mental steps in the human mind.

As illustrated in FIG. 1, the server 120 can include a data store 122 and an access pattern modeling module 124. The access pattern modeling module 124 of the server 120 may receive access data reported from the access data recordation module 104 of the synchronization application 102 on the client 110, and is one means for performing this function. The access pattern modeling module 124 may receive access data reported from multiple clients 110 and across multiple users of those clients, for example, as these clients 110 access files that are synchronized, as well extracting access data as from server logs of the server 120. The access data can be for application access of files on the same device or across the network, or a combination thereof. The access pattern modeling module 124 analyzes the received access data to identify the access patterns applicable to a respective application 105 and file type, and create and/or update a model according to the identified access patterns. An access pattern for a given application can include an ordering of a plurality of non-sequentially offset data blocks within a file.

The model may be, for example, a statistical model that identifies the likely order of access of data from a file of a particular file type when accessed by a particular application 105 in terms of offset values for the first one or more data blocks of the file. For example, given a population of historical file access data, each file access is for a given file by a given application, and includes information describing the sequence of data blocks requested by the application. The predicted order of access from the file generally includes at least one series or sequence of non-contiguous blocks. This access data is aggregated by at least file type and preferably by application as well, so as to determine the probabilities of each data block being accessed, along with the transition probabilities of access between data blocks. The access data can also be aggregated with respect to synchronization attributes associated with at least one of the application or the file type, such as to whether the files of that type (or used by that application) are synchronized or not, the number of clients, users, or groups having access to the files of that type or application, the frequency at which the files of that type or application are accessed, and the like. The access and transition probabilities for a given set of access data can be used to determine the order or sequence of block accesses. Any technique for modeling sequences of events known to those of skill in the art may be used, such as Hidden Markov Models (see, Baum, L. E., Petrie, T, *Statistical Inference for Probabilistic Functions of Finite State Markov Chains*, The Annals of Mathematical Statistics 37 (6): 1554-1563 (1966)), Maximum entropy Markov Models (see, McCallum, A., Freitag, D., & Pereira, F., *Maximum entropy Markov models for information extraction and segmentation*, Proc. 17$^{th}$ International Conf. on Machine Learning, Stanford, Calif., pp. 591-598 (2000); Conditional Random Fields (see, Lafferty, J., McCallum, A., Pereira, F., *Conditional random fields: Probabilistic models for segmenting and labeling sequence data*, Proc. 18$^{th}$ International Conf. on Machine Learning, Williams College, Williamstown, Mass., pp. 282-289 (2001)). One embodiment of the operation of the access pattern modeling module 124 is described below with reference to FIG. 3.

The data store 122 stores files 100 for access by clients 110, for example, as part of a synched file system. The server 120 receives a request for a file 100 of a particular type from a particular application. The server 120 can use the combination of the application, including the application version, and file type to determine the appropriate predictive model of the data access pattern that the application is likely to use for the particular file type. The server 120 then starts serving the data to the application according to the order specified by the predictive model, for example by streaming the data blocks. The server 120 accesses the file 100 from the data store 122 and streams the data from the file 100 over the network 101 to the client 110. The data blocks corresponding to a file 100 do not need to be stored in any particular order within data store 122. In one embodiment they are randomly accessible such that there is no significant difference in performance of the server 120 between serving non-contiguous data blocks as well as contiguous data block.

Network 101 represents the communication pathways between the clients 110 and the server 120. In one embodiment, the network 101 uses standard Internet communications technologies and/or protocols. In one embodiment, the network 101 uses standard Internet communications technologies and/or protocols. Thus, the network 101 can include links using various communication models, such as protocols and standards consistent with the OSI model, including various layers such as physical, data link, network, transport, session, presentation, and application layers.

Figure 2:
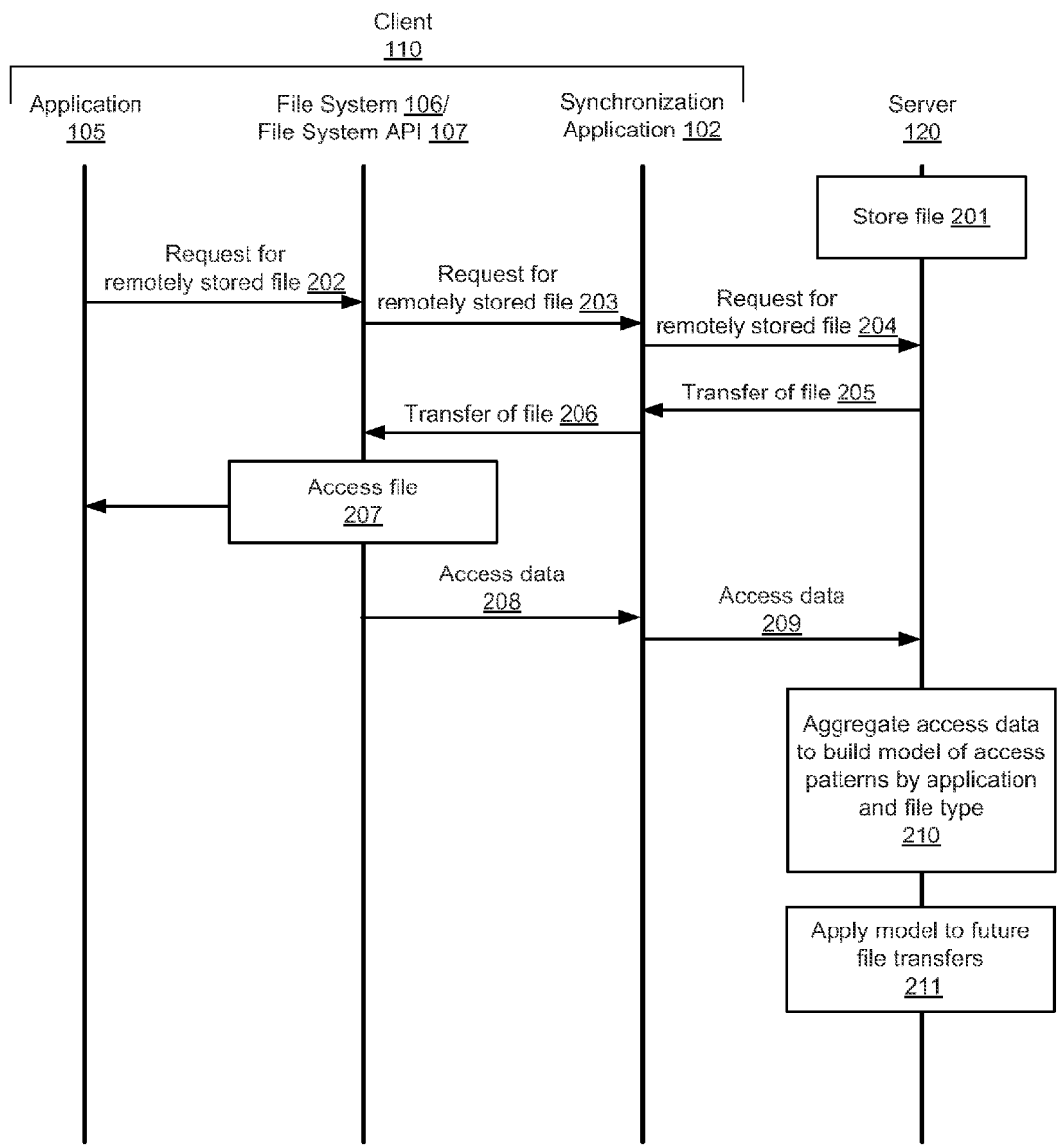
FIG. 2 shows an interaction diagram illustrating the collection of access data to build a model of access patterns, in accordance with an embodiment of the invention.

FIG. 2 is an interaction diagram illustrating the collection of access data to build a model of access patterns, in accordance with an embodiment. In step 201 of the scenario illustrated in FIG. 2, the server 120 has stored a file 100. In step 202, an application 105 executing on the client 110 requests the remotely stored file 100 from the file system 106, for example by selecting the file through a file explorer. In step 203, the file system API 107 passes the request for the remotely stored file to the client's synchronization application 102. In step 204, the synchronization application 102 forwards the request for the remotely stored file to the server 120, for example using the server interaction module 103 of the synchronization application 102.

Responsive to the received request, in step 205, the server 120 transfers the file to the synchronization application 102. In step 206, the synchronization application 102 relays the transfer of the file to the file system 106. Accordingly, in step 207, the file system 106 can access the file locally and can convey data from the accessed file to the application 105, thus fulfilling the original request in step 202 for the remotely stored file 100.

The accessing of the file in step 207 also triggers the file system API 107 to send access data to the synchronization application 102, specifically the access data recordation module 104 of the synchronization application 102, in step 208. As described above, the access data includes the application that accesses a file, the file type, and the order that the data within the file are accessed. In some cases, the file name and other information about the data access are also recorded, such as the application version. In step 209, the synchronization application 102 reports the access data to the server 120, specifically the access pattern modeling module 124 of the server 120.

In step 210, the server 120 aggregates the access data, for example across multiple clients and multiple users of those clients, to create a predictive model of access patterns by application and file type. Each predictive model is characterized by an associated application and data file type, thereby allowing for a plurality of different models; e.g., assuming M applications and N file types, there are potentially M×N predictive models. In practice, the M applications and N file types are selected to represent applications and file types that are commonly used, since commonly used applications and file types account for the majority of requests to the server 120, and thus offer the most potential for increased performance by the server 120. An example method of aggregating the access data for this purpose is described below with reference to FIG. 3. Once the model of the access pattern for a particular application and file type is created, the model can be applied 211 to future file transfers for the application and file type to stream the file data in the order that the client 110 is likely to need to access the data, thus enabling the client device faster access to the data. More specifically, when the server 120 receives a request from a client device 110 for a data file, the server 120 determines from the request the application make the request and the file type of the requested data file. The server 120 then determines the predictive model associated with that particular combination of application and file type, and access the predictive model. From the accessed predictive model, the server 120 determines the sequence of data blocks most likely to be requested by the application, and begin transmitting and/or caching the data blocks of the file in determined sequence.

For example, without a predictive model of file access patterns, upon receiving a request for a file, the server 120 would stream sequential data blocks from the file, beginning with the first data block requested. This sequence however likely does not reflect the actual order in which the application users the data blocks. For example, server 120 would stream block 1 followed by block 2, followed by block 3, and so forth through block 1000, but the application may require, for example, blocks 50, 24 and 38 before the client 110 can download blocks 7 and on, in which case the application will stall (with time proportional to the latency between the client 110 and server 120) as the client 110 kills the current stream after block 6 and starts a new request at block 50. By contrast, in conjunction with the embodiment, the server 120 determines for the given application and file type a predictive model that indicates an access pattern that starts with blocks 1-6, then blocks 50, 24, 38, 7-23, 25-37, 39 . . . 1000. The server 120 can stream the blocks in that order without the client 110 having to wait for later delivered blocks or kill the current stream and start a new request for block 50. The time saved by using the predictive model depends upon the latency between the client 110 and server 120 as well as upon the extent to which the access pattern diverges from the order in which the server 120 would otherwise stream the data blocks of a file 100.

Figure 3:
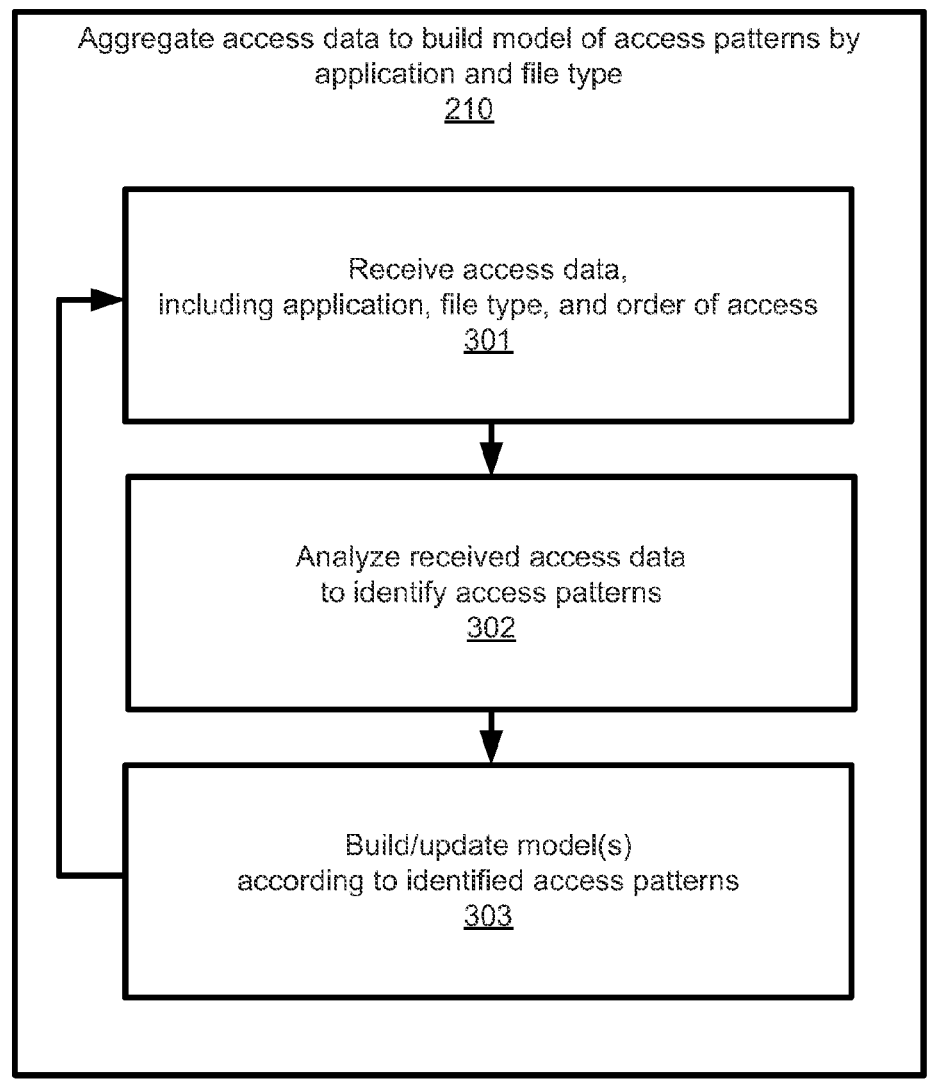
FIG. 3 shows a flow chart illustrating a method of aggregating access data to build a model of access patterns by application and file type, in accordance with an embodiment of the invention.

FIG. 3 is a flow chart illustrating a method of performing step 210 of FIG. 2. Specifically, FIG. 3 illustrates a method of aggregating access data to build a model of access patterns by application and file type, such as may be executed by an access pattern modeling module 124 of the server 120 as part of a synched file system, in accordance with an embodiment of the invention. In step 301, access data, including the application, application version, file type, and order of access to the file data is received, for example across multiple clients 110 and multiple users of those clients. A plurality of file accesses can be aggregated, where each instance of access data includes a respective application accessing the file, including the application version, a respective file type, and a respective order of access of data blocks within the file. As noted above, the aggregation can take into account synchronization attributes, for example the number of clients that have maintained synchronized versions of the files. Selecting access data based upon the synchronization attributes of the underlying files provides enables the predictive models to better reflect the manner in which applications access files that are frequently synchronized.

In step 302, the received access data is analyzed to identify access patterns. The analysis performed may be a statistical analysis of the probability that various blocks of data within the data file may be read out of order and the order in which they are likely to be read for a combination of an application and a file type. The probability may be different for different versions of an application. For example, different versions of an application may read the blocks in a different order. The order may be recorded by reference to offset values for the data blocks of the file, or any other labeling mechanism to identify the order of the data blocks. For example, for each pair of block offset (i, j) (for i, j=0 to some maximum offset number) the frequency at which that block i is read followed by block j is determined from the access data. From these frequencies, transitions probabilities between blocks can be determined, and used to identify the most probable or likely sequence of block access. As described above, any technique for modeling sequence patterns known to those of skill in the art can be used to identify the access patterns applicable to a respective application and file type, or synchronization attribute. Then, in step 303, a predictive model is built or updated according to the identified access patterns, for example by the access pattern modeling module 124. Steps 301-303 can be iterated for additional access data that is received from one or more clients 110, so that the models are updated to reflect the most recent access data that is available to the server 120. Thus, if the access pattern of an application and file type combination should change over time, the predictive model can adapt accordingly. As future requests are received by the server 120 from the application for a file of the file type corresponding to a predictive model, the server 120 can serve the data blocks from the file according to the most current predicted order of access by applying the most current model.

Additional Configuration Considerations

The disclosure herein has been described in particular detail with respect certain embodiments of the invention. Those of skill in the art will appreciate that other embodiments may be practiced, and that various changes in form and details can be made therein without departing from the spirit and scope of the invention.

First, it should be noted that the language used in the specification has been principally selected for readability and instructional purposes, and may not have been selected to delineate or circumscribe the inventive subject matter. Thus, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Second, portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Third, reference to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

As set forth above, the server 120 is embodied in a computer system having a number of modules. This computer system may be specially constructed for the required purposes, or it may comprise a general-purpose computer selectively activated or reconfigured by one or more computer programs stored in the computer system, which programs implemented the above described modules. Such computer programs (modules) may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus accessible by one or processors. Accordingly, unless expressly stated otherwise, it is understood that throughout the description, terms such as "determining", "processing", "selecting" "accessing" or the like, refer to the action and processes of a computer system, or similar electronic computing device, that manipulates and transforms data represented as physical (electronic) quantities within the computer system memories or registers or other such information storage, transmission or display devices—and do not refer to mental steps made by a human being.

Finally, the embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Accordingly, the disclosure herein is intended to be illustrative, but not limiting, of the scope of the invention, which is set forth in the following claims.

What is claimed is:

1. A computer-implemented method comprising:
receiving access data identifying access by a plurality of applications to requested files, each instance of access data for a file access indicating: a requested file, an application accessing the requested file, a file type of the requested file, and a respective order of access by the application of data blocks within the requested file of the file type;
analyzing the received access data to identify access patterns for different combinations of a given application and a given file type;
creating a model of an access pattern for a combination of the given application and the given file type, the model indicating a predicted non-sequential order of access of data blocks of a file by the given application;
responsive to a subsequent request received from the given application for a file of the given file type,
determining from the model for the combination of the given application and the given file type, the predicted non-sequential order of access of data blocks of the file by the given application, and
serving data blocks from the file to the given application according to the predicted non-sequential order;
receiving, subsequent to serving data blocks from the file, a second set of access data identifying access to requested files;
aggregating, from the second set of access data, update data for the combination of the given application and the given file type; and
updating the model of the access pattern for the combination of the given application and the given file type using update data, the updated model indicating a second predicted non-sequential order of access of data blocks of a file by the given application, wherein the second predicted non-sequential order is distinct from the predicted non-sequential order.

2. The method of claim 1, wherein the access pattern includes an ordering of a plurality of non-sequentially offset data blocks within a file.

3. The method of claim 1, wherein the predicted non-sequential order of access of data blocks from the file comprises an offset of a first data block to be read and an offset of a second data block to be read, wherein the second data block is non-contiguous with the first data block.

4. The method of claim 1, wherein creating the model of the access pattern for the combination of the given application and the given file type further comprises creating a model based upon transition probabilities between data blocks in the file.

5. The method of claim 1, wherein creating the model of the access pattern for the combination of the given application and the given file type further comprises creating a model based on synchronization attributes associated with at least one of given application and given file type.

6. The method of claim 1, wherein applying the model to serve data blocks comprises streaming data blocks of the file according to the predicted non-sequential order of access.

7. The method of claim 1, wherein the model is specific to a version of the application.

8. A computer-implemented method comprising:
storing a plurality of models of access patterns for a plurality of applications and file types, each access pattern corresponding to an application and a file type and each model indicating a predicted non-sequential order of access of data blocks of a file of the file type by the application;
receiving a request by a file server from an application for a file of a file type;
determining from the model for the application for the file of the file type, a predicted non-sequential order of access of data blocks within the file of the file type;
serving data blocks of the file of the file type to a requesting application according to the predicted non-sequential order; and
updating the model for the requesting application for the file of the file type subsequent to serving data blocks of the file, the updated model indicating a second predicted non-sequential order of access of data blocks of a file by the requesting application, wherein the second predicted non-sequential order is distinct from the predicted non-sequential order.

9. The method of claim 8, wherein the predicted non-sequential order comprises an ordering of a plurality of non-sequentially offset data blocks from a file.

10. The method of claim 8, wherein the predicted non-sequential order comprises an offset of a first data block to be read and an offset of a second data block to be read.

11. The method of claim 8, wherein serving data blocks of the file comprises streaming data blocks of the file from the file server over a network to the requesting application on a client device according to the predicted non-sequential order.

12. The method of claim 8, wherein the model is based upon transition probabilities between data blocks in the file.

13. The method of claim 8, wherein creating the model is based on synchronization attributes associated with at least one of the application and the file type.

14. A computer system, comprising:
a processor;
a storage device configured to store a plurality of files, each file having a respective file type;
a non-transitory memory storing instructions, which when executed by the processor cause the processor to serve files from the storage device to client devices in response to file requests by a plurality of applications on the client devices,
an access pattern modeling module, executed by the processor, and configured to:
receive, from the client devices, access data identifying access by the applications to the requested files, each instance of access data for a file access indicating: a requested file, an application accessing the requested file, an application version, a file type of the requested file, and a respective order of access by the application of data blocks within the requested file of the file type;
analyze the received access data to identify access patterns for different combinations of a given application and a given file type and to create a model of the access pattern for a combination of the given application, an application version, and the given file type, the model indicating a predicted non-sequential order of access of data blocks from a file by the application with the application version;
wherein a server module is configured, responsive to a subsequent request received from the given application for a file of the given file type, to determine from the model for a combination of the given application and the given file type, a predicted non-sequential order of access of data blocks of the file by the given application, and to serve data blocks from the file to the given application according to the predicted non-sequential order; and
wherein the access pattern modeling module is further configured, subsequent to data blocks from the file being served to the given application, to update the model of the access pattern for a combination of the given application, application version, and the given file type, the updated model indicating a second predicted non-sequential order of access of data blocks of a file by the given application, wherein the second predicted non-sequential order is distinct from the predicted non-sequential order.

15. The computer system of claim 14, wherein the access pattern identified by the access pattern modeling module includes an ordering of a plurality of non-sequentially offset data blocks within a file.

16. The computer system of claim 14, wherein the predicted non-sequential order of access of data blocks from the file comprises an offset of a first data block to be read and an offset of a second data block to be read, wherein the second data block is non-contiguous with the first data block.

17. The computer system of claim 14, wherein the access pattern modeling module is further configured to create the model of the access pattern for a combination of the given application, application version, and the given file type based upon transition probabilities between data blocks in the file.

18. The computer system of claim 14, wherein the access pattern modeling module is further configured to create the model based on synchronization attributes associated with at least one of an application, an application version, and a file type.

19. The computer system of claim 14, wherein the server module is further configured to serve data blocks by streaming data blocks of the file according to the predicted non-sequential order of access.

20. A computer program product, comprising:
a non-transitory computer readable medium, having stored thereon computer executed program instructions which upon execution by a processor, cause the processor to serve files from a storage device to client devices in response to file requests by a plurality of applications on the client devices,
an access pattern modeling module configured, upon execution by the processor, to:
receive access data from the client devices, the access data identifying access by applications to the requested files, each instance of access data for a file access indicating: a requested file, an application accessing the requested file, an application version, a file type of the requested file, and a respective order of access by the application of data blocks within the requested file,
analyze received access data to identify access patterns for different combinations of a given application and a given file type, and
create a model of the access pattern for the combination of the given application and the given file type, the model indicating a predicted non-sequential order of access of data blocks of a file by the application for the application version;
wherein a server module is configured upon execution by the processor, responsive to a subsequent request received from a given version of an application for a file of a given file type, to determine from the model for the combination of the given version of the application and the given file type, a predicted non-sequential order of access of data blocks of the file by the given version of the application, and to serve data blocks from the file to the given application according to the predicted non-sequential order; and
wherein the access pattern modeling module is further configured, subsequent to data blocks from the file being served to the given application, to update the model of the access pattern for a combination of the given application and the given file type, the updated model indicating a second predicted non-sequential order of access of data blocks of a file by the given application, wherein the second predicted non-sequential order is distinct from the predicted non-sequential order.

21. The computer program product of claim 20, wherein a first client device from the client devices is authorized on a first user account and a second client device from the client devices is authorized on a second user account.

22. The computer program product of claim 21, wherein the first client device is configured to run a first operating system and the second client device is configured to run a second operating system.

* * * * *